(No Model.)
S. E. PEARCE & G. W. MERRILL.
HOSE COUPLING.
No. 404,429. Patented June 4, 1889.
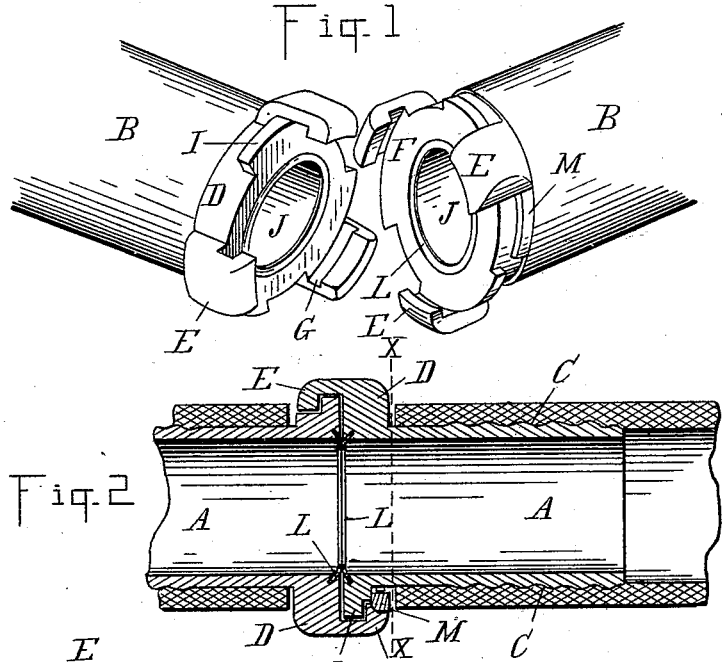
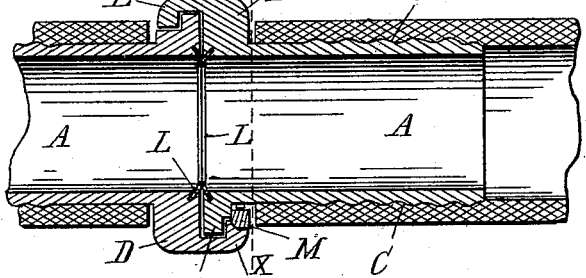
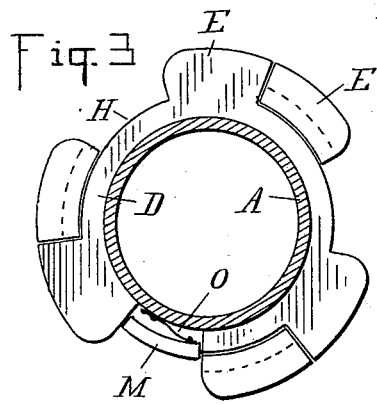
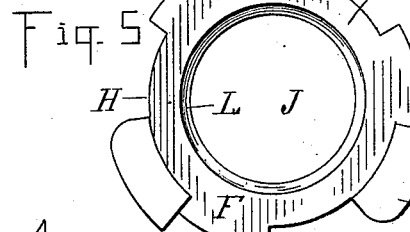
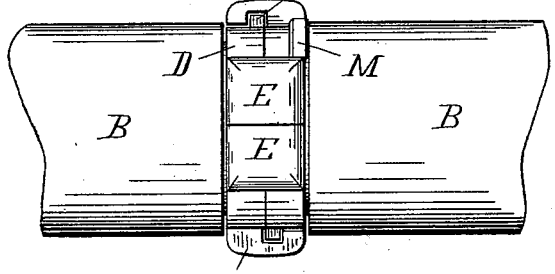
Witnesses:
P. M. Hulbert
J. Paul Mayer
Inventors:
Spain E. Pearce
George W. Merrill
By Thos. S. Sprague & Son
Atty.

UNITED STATES PATENT OFFICE.

SPAIN EDWARD PEARCE AND GEORGE WASHINGTON MERRILL, OF ALGONAC, MICHIGAN.

HOSE-COUPLING.

SPECIFICATION forming part of Letters Patent No. 404,429, dated June 4, 1889.

Application filed February 11, 1889. Serial No. 299,484. (No model.)

*To all whom it may concern:*

Be it known that we, SPAIN EDWARD PEARCE and GEORGE WASHINGTON MERRILL, citizens of the United States, residing at Algonac, in the county of St. Clair and State of Michigan, have invented certain new and useful Improvements in Hose-Couplings, of which the following is a specification, reference being had therein to the accompanying drawings.

This invention relates to new and useful improvements in hose-couplings; and the invention consists in the peculiar construction and arrangement of the parts, all as more fully hereinafter described, and shown in the accompanying drawings, in which—

Figure 1 is a perspective view of our coupling with the two members detached. Fig. 2 is a vertical central section through the coupling. Fig. 3 is a cross-section on line X X in Fig. 2 through the shank of the coupling. Fig. 4 is a side elevation of the coupling, and Fig. 5 is an elevation of the coupling-face of one of the members of the coupling.

Our coupling belongs to that class in which the two members are alike and interchangeable with each other, and consists of the following parts:

A is the shank of the coupling, of suitable size to receive and hold the end of the flexible hose B by means of suitable corrugations C on the outside, and the application of the usual hose-clamps, or in any other known manner.

D is the head of the coupling, formed integral with the coupling-shank and provided with hooks E, which peripherally project from and extend beyond the coupling-face F of the head, and are provided with the grooves G upon their inner faces.

The spaces left between the coupling-hooks on the periphery of the coupling-head are divided into two parts, the part H being plain, and the other part being provided with a segmental flange I of such size and shape as to fit the grooves in the coupling-hooks E. Around the mouth J of each half of the coupling is cut an angular groove, in which is secured an elastic ring L, which projects inwardly.

The parts being constructed and arranged as shown and described, they are intended to operate as follows: By bringing the hooks of one half of the coupling to register with the blank spaces H in the opposite half of the coupling the two couplings are brought together, and then by rotating them in opposite directions the grooves in the coupling-hooks of one half of the coupling engage with the flanges I of the opposite flange I, and thereby hold the two couplings together. The joint is obtained by means of the angularly-projecting elastic rings in the mouth of each half of the coupling, which approach each other and form a V-shaped joint, which is made tight by the pressure of the fluid carried through the coupling. To prevent accidental uncoupling of the two halves, we provide one or both of the couplings with the stop M, which is secured to the free end of the spring O and can be depressed flush with the flat spaces H, and is adapted to enter between two pairs of coupling-hooks when coupled. To effect a tight joint between the two halves of the coupling, we rely entirely upon the elastic position of the angular rings L, and construct the flanges I, grooves G, and the coupling-hooks merely to hold the two halves of the coupling together without clamping them against each other, as is the case with couplings of this character, wherein the flanges J are cam-shaped. Thus, in coupling, the two halves can be rotated until the coupling-hooks come together side by side. A coupling of this construction may therefore be much more readily coupled and uncoupled than where the two coupling-faces have to be wedged or clamped tightly upon each other to effect a tight joint, and the coupling is therefore of especial advantage for use with hose intended to carry water or steam under pressure. The elastic rings may be made of flat rings of rubber of very little thickness, provided the coupling-faces are made to meet, or nearly so. Instead of the spring-stop M, any other suitable means for locking the two halves of the coupling together may be used. To uncouple, the spring-stop M is depressed in its recess until it becomes flush with the flat space H, in which it operates. Then the coupling-heads are rotated in a reverse direction to that of coupling until the flange I and hooks E are disengaged.

What we claim as our invention is—

In a hose-coupling consisting of two like members, the combination, with the grooved coupling-hooks E, with the spaces between the hooks formed with the plain part H and segmental flange I, of the stop M, arranged at right angles to the axis of the coupling and adapted to enter between two pairs of coupling-hooks when coupled, the spring O beneath said stop, and the elastic rings set angularly around the mouth of each of the members of the coupling, substantially as shown and described.

In testimony whereof we affix our signatures, in presence of two witnesses, this 25th day of January, 1889.

SPAIN EDWARD PEARCE.
  GEORGE WASHINGTON MERRILL.

Witnesses:
 S. H. BURNHAM,
 FRANK THOMAS.